(12) United States Patent
Yandle, II

(10) Patent No.: US 6,715,270 B1
(45) Date of Patent: *Apr. 6, 2004

(54) WEED CUTTER INCLUDING MULTI-MEDIUM WEED CUTTING HEAD

(76) Inventor: S. Elwood Yandle, II, 5883 Rhodes Ave., New Orleans, LA (US) 70131

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 733 days.

(21) Appl. No.: 09/100,494

(22) Filed: Jun. 19, 1998

Related U.S. Application Data

(60) Provisional application No. 60/050,337, filed on Jun. 20, 1997.

(51) Int. Cl.[7] ............................................. A01D 34/00
(52) U.S. Cl. .................................. 56/12.7; 30/276
(58) Field of Search ................. 56/12.1, 12.7, 56/17.5, 255, 245, DIG. 17, DIG. 20; 30/276

(56) References Cited

U.S. PATENT DOCUMENTS

| | | | | |
|---|---|---|---|---|
| 2,707,859 A | * | 5/1955 | Walker | 56/12.7 |
| 2,708,335 A | * | 5/1955 | Newton | 56/12.7 |
| 2,857,792 A | * | 10/1958 | McNish | 72/458 |
| 3,018,602 A | * | 1/1962 | Diesterweg | 56/12.7 |
| 3,303,637 A | * | 2/1967 | Wixson | 56/295 |
| 3,722,256 A | * | 3/1973 | Iascone | 72/470 |
| 4,068,376 A | * | 1/1978 | Briar | 30/276 |
| 4,126,990 A | * | 11/1978 | Fisher et al. | 56/295 |
| 4,126,991 A | * | 11/1978 | Gobin et al. | 56/295 |
| 4,267,686 A | * | 5/1981 | Heath | 56/12.7 |
| 4,406,065 A | * | 9/1983 | Kohler | 30/347 |
| 4,423,757 A | * | 1/1984 | Broberg, Jr. | 140/123 |
| 4,641,431 A | * | 2/1987 | Leming et al. | 30/276 |
| 4,805,389 A | * | 2/1989 | Hawkenson | 56/295 |
| 4,905,465 A | * | 3/1990 | Jones et al. | 56/12.7 |
| 5,029,435 A | * | 7/1991 | Buchanan | 56/12.1 |
| 5,197,264 A | * | 3/1993 | Lacey | 56/12.1 |
| 5,313,770 A | * | 5/1994 | Smothers | 56/12.7 |
| 5,365,724 A | * | 11/1994 | Wagner | 56/12.1 |
| 5,713,191 A | * | 2/1998 | Welton | 56/12.1 |
| 5,768,867 A | * | 6/1998 | Carlsen | 56/12.1 |
| 5,862,598 A | * | 1/1999 | Lee | 30/276 |

FOREIGN PATENT DOCUMENTS

| | | | | |
|---|---|---|---|---|
| FR | 1058467 | * | 11/1953 | 56/12.7 |
| FR | 74 23800 | * | 4/1976 | 56/12.7 |
| GB | 774218 | * | 5/1957 | 56/12.7 |
| GB | 1057841 | * | 2/1967 | 56/12.7 |

* cited by examiner

*Primary Examiner*—Árpád Fábián Kovács
(74) *Attorney, Agent, or Firm*—Garvey, Smith, Nehrbass & Doody, L.L.C.; Seth M. Nehrbass

(57) ABSTRACT

Apparatus similar to a Weed-Eater® weed trimmer, but instead of monofilament line, it uses recycled coat hangers to cut weeds. There are two plates, the lower one having grooves within which to fit the coat-hangers after they are prepared using a special tool to bend them to the proper shape. Aside from the cutting part, the rest of the machine can be like a Weed-Eater® brand weed trimmer. The two plates are held together with a retaining nut. Hardwire, wire cable, nails, or heavy duty plastic cord can also be used as blades.

20 Claims, 15 Drawing Sheets

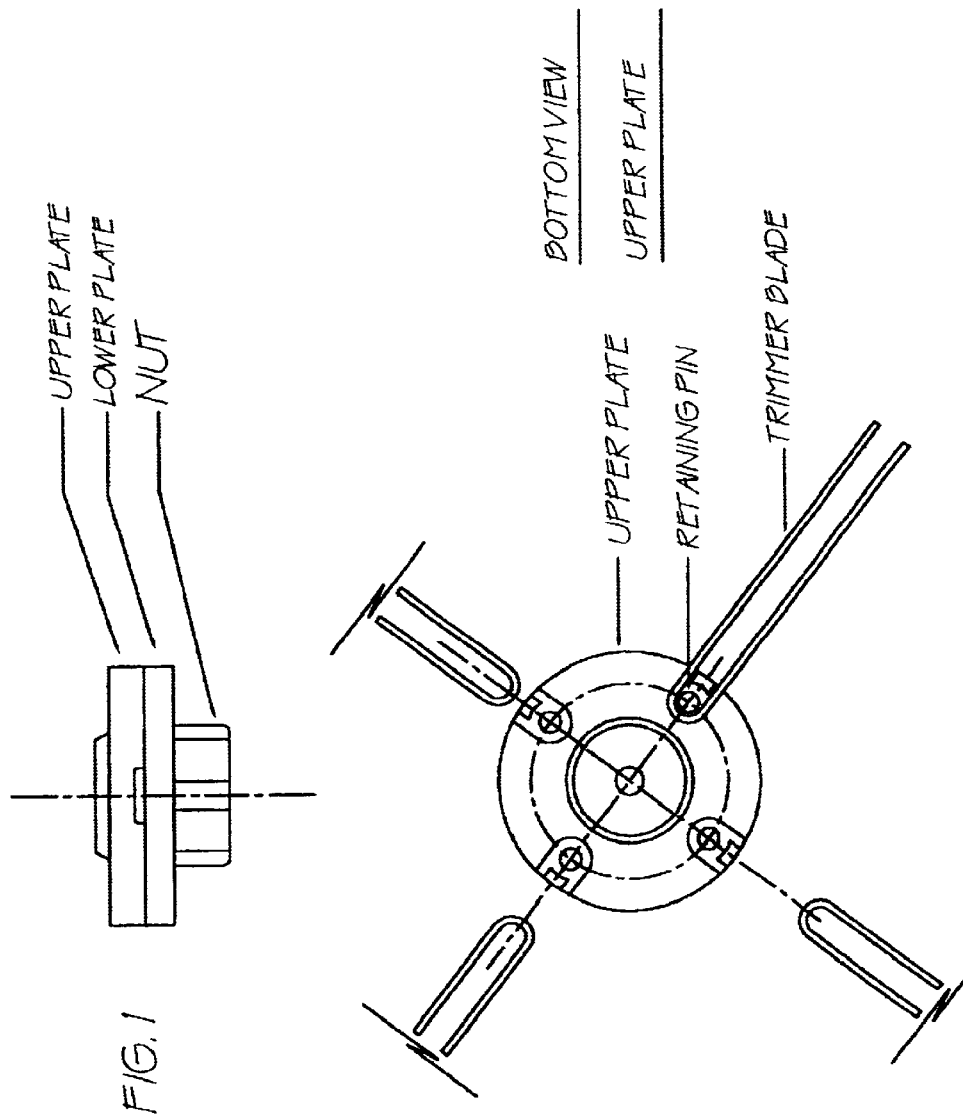

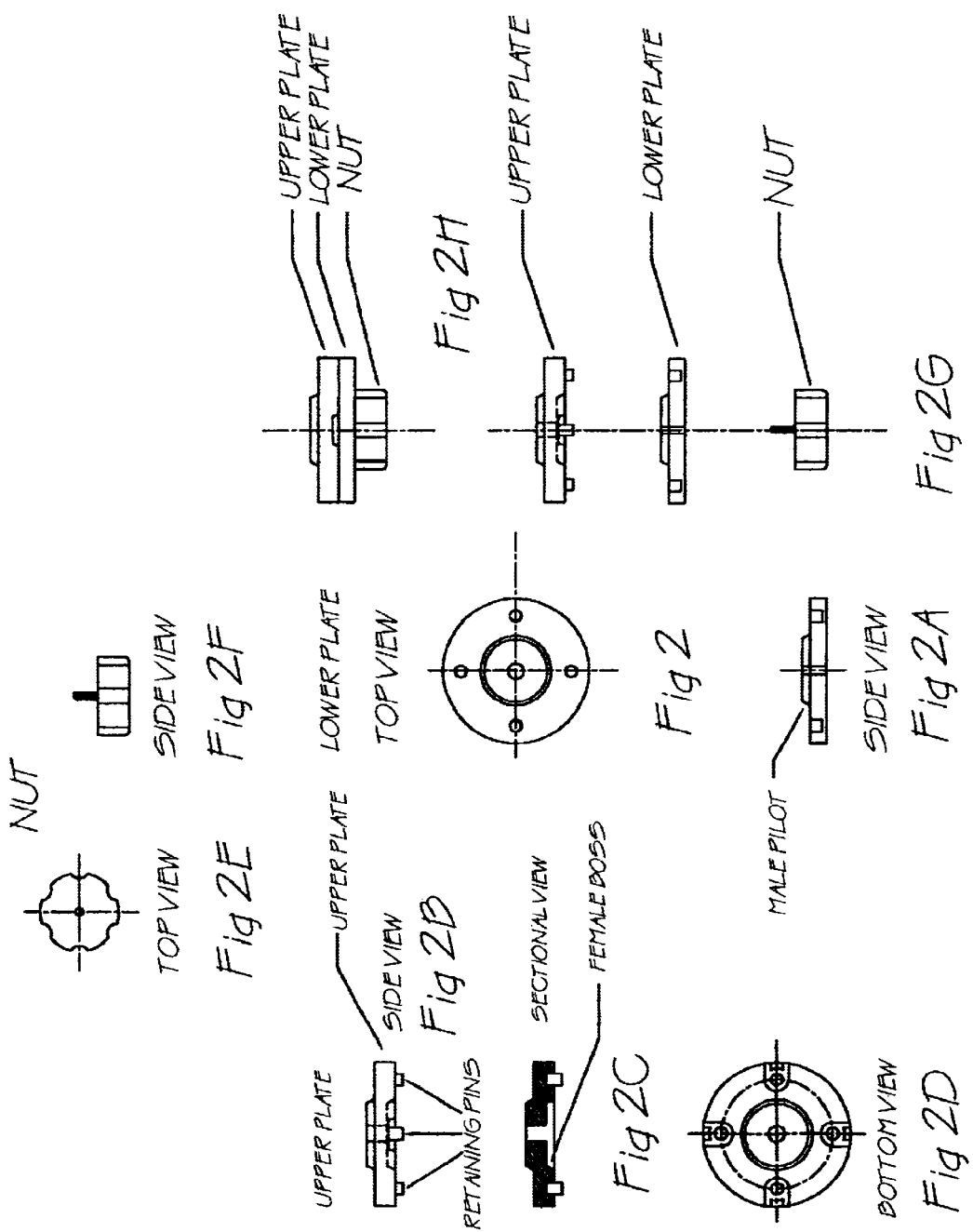

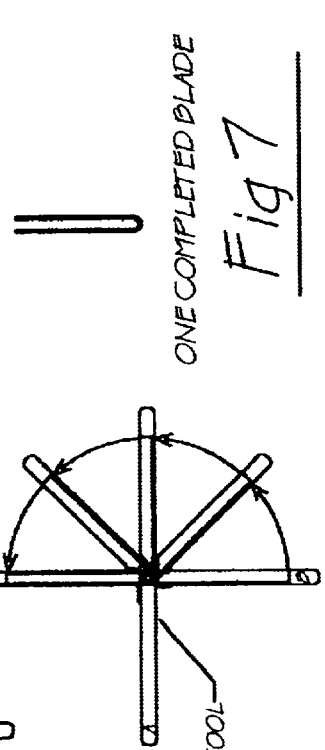

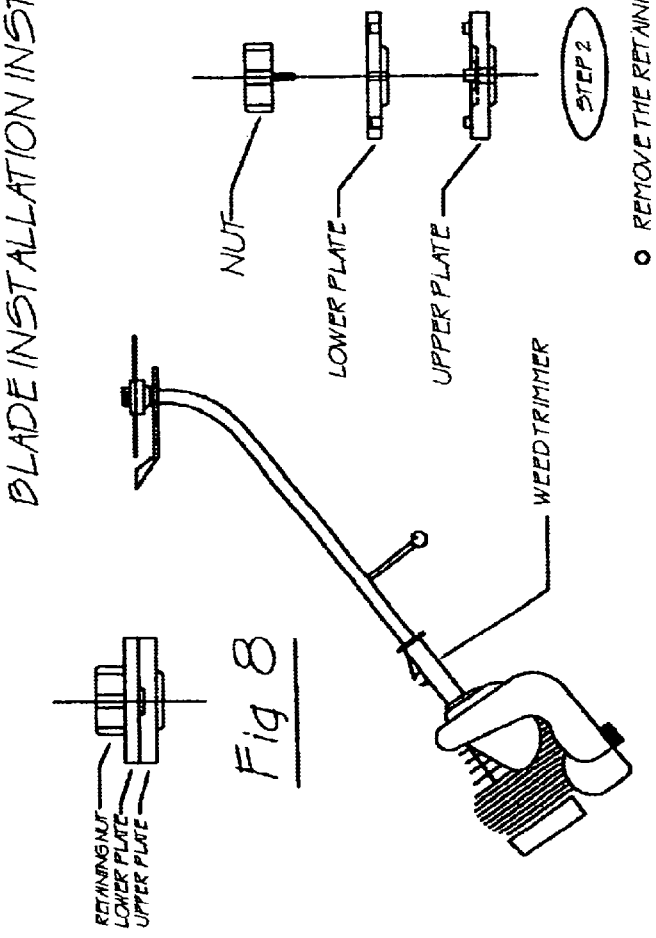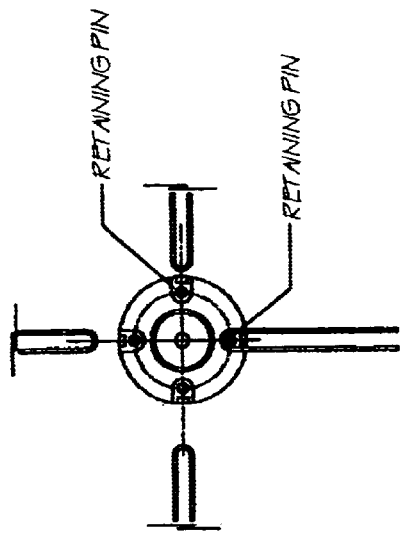

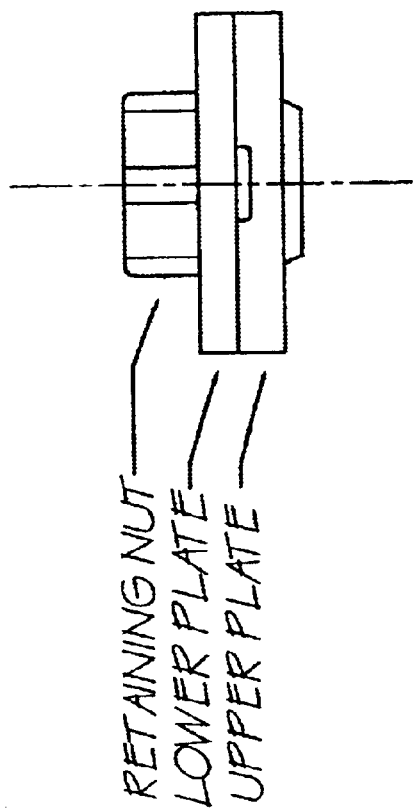

Blade #1 Coat hanger wire or "WeedAway" wire for the most difficult cutting jobs. (IE heavy weeds)
Blade #2 Standard weed trimming cord for normal cutting jobs
Blade #3 1/8" cable for trimming along concrete

WEEDAWAY WITH RUBBER SHEILDED BLADES INSTALLED

WEEDAWAY BLADE WITH RUBBER HOSE INSTALLED

DOMESTIC WEEDAWAY

Weedaway Bottom Half

Weedaway Bottom Half

Weedaway Top Half

Weedaway Top Half

Weedaway Bottom Half

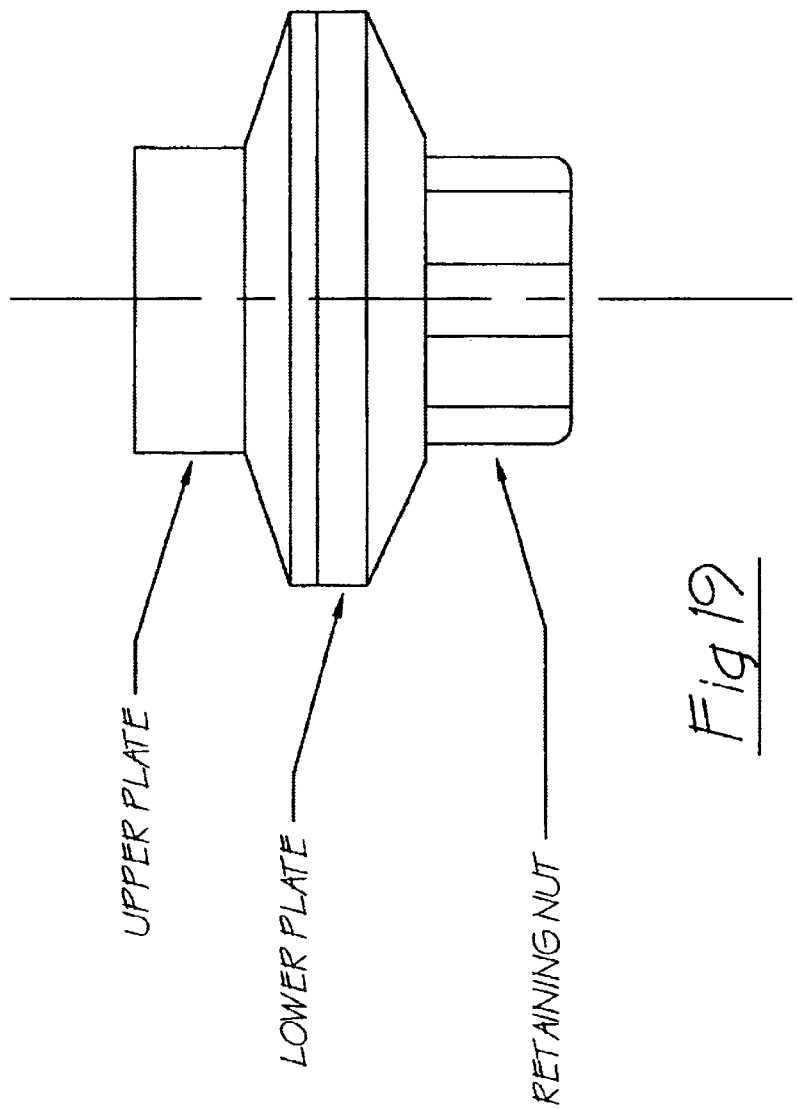

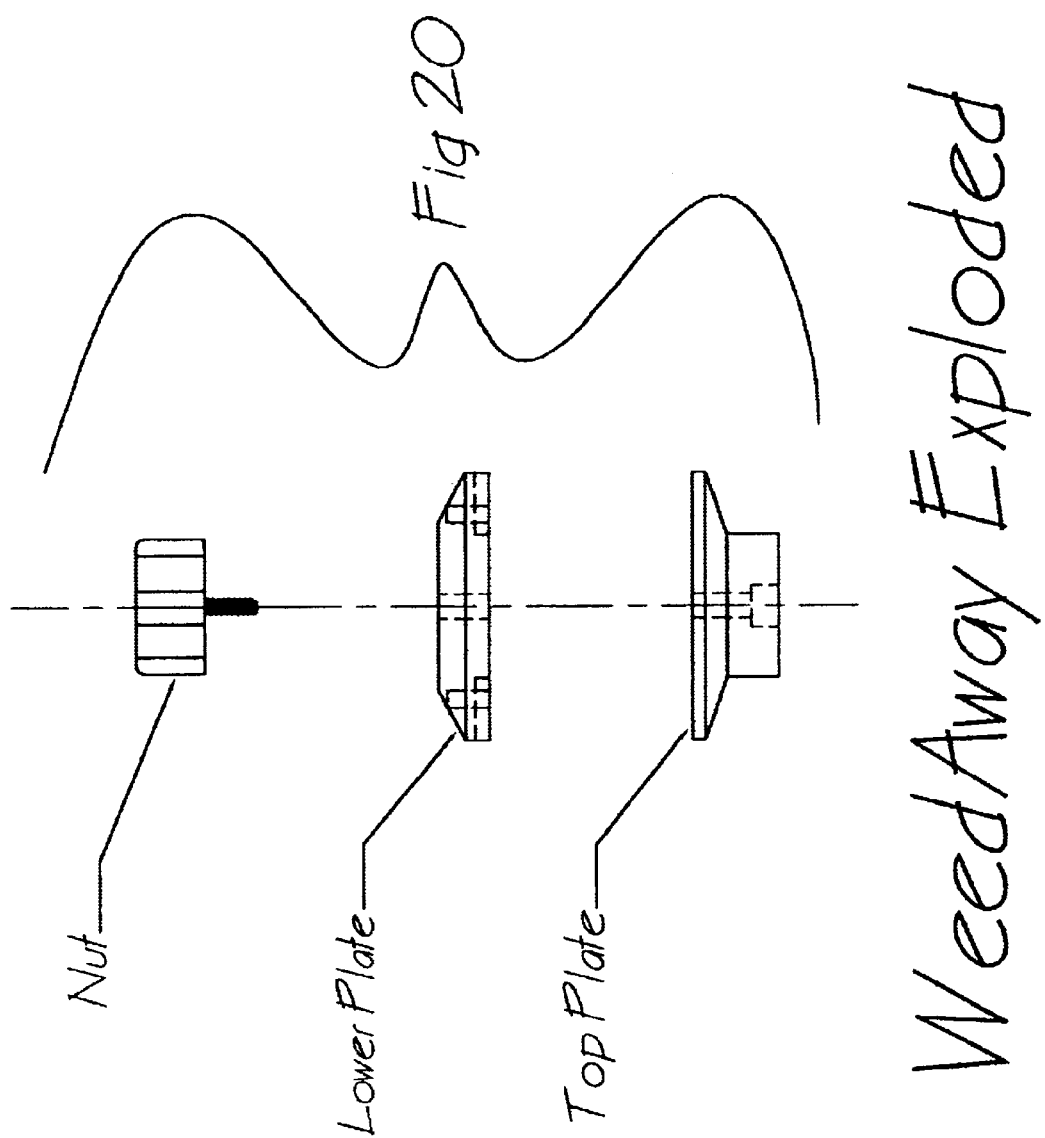

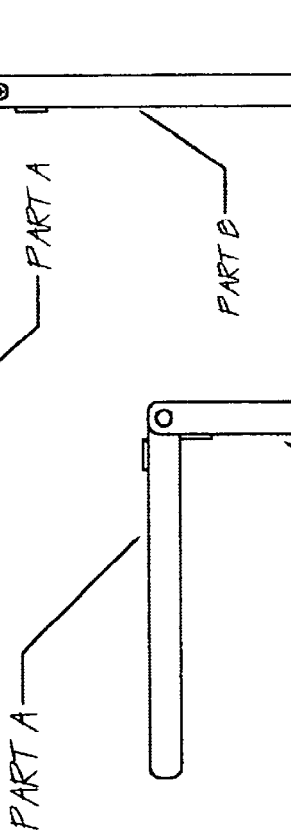
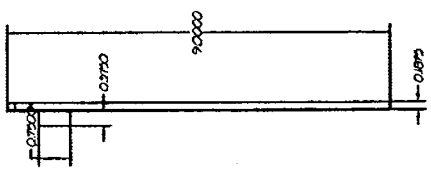
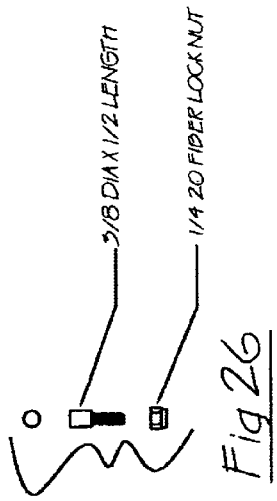

Weedaway Top Half

Weedaway Bottom Half

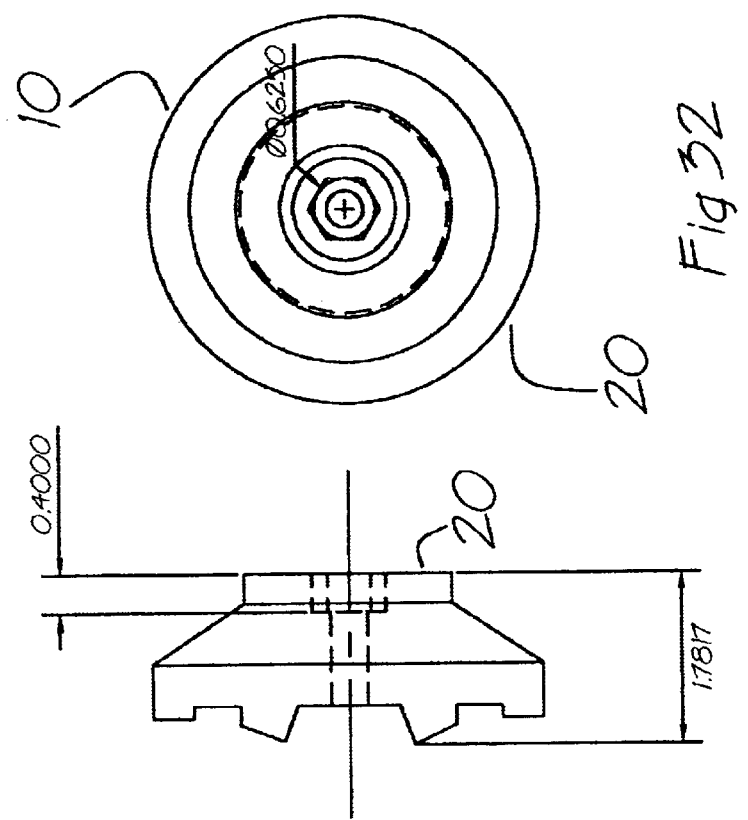
Fig 32 Weedaway Top Half
Fig 31
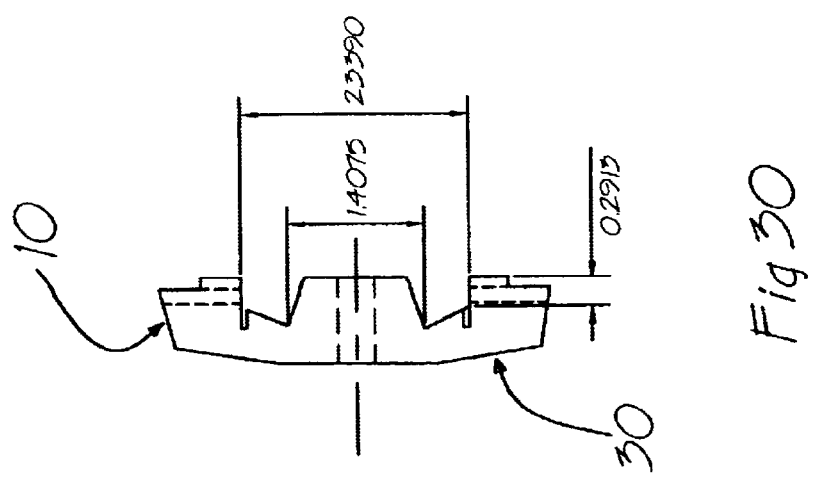
Fig 30 Weedaway Bottom Half

WEED CUTTER INCLUDING MULTI-MEDIUM WEED CUTTING HEAD

CROSS-REFERENCE TO RELATED APPLICATIONS

Priority of U.S. Provisional Patent Application Ser. No. 60/050,337, filed Jun. 20, 1997, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to weed trimmers.

2. General Background of the Invention

The following U.S. Patents are incorporated herein by reference: U.S. Pat. Nos. 2,707,859, 2,708,335, 3,018,602, 4,406,065, 4,805,389, 4,641,431, 2,857,792, 3,722,256, 4,423,757.

BRIEF SUMMARY OF THE INVENTION

The apparatus of the present invention solves the problems confronted in the art in a simple and straightforward manner. What is provided is a weed trimmer which uses recycled coat hangers, e.g., as blades. The trimmer can also use other types of blades, such as 20d common nails. One does not need to buy special blades to use with the weed trimmer of the present invention.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 1–26 disclose a first embodiment of the apparatus of the present invention; and FIGS. 27–33 show the preferred embodiment of the apparatus of the present invention.

DETAILED DESCRIPTION OF THE INVENTION

Figure 14:
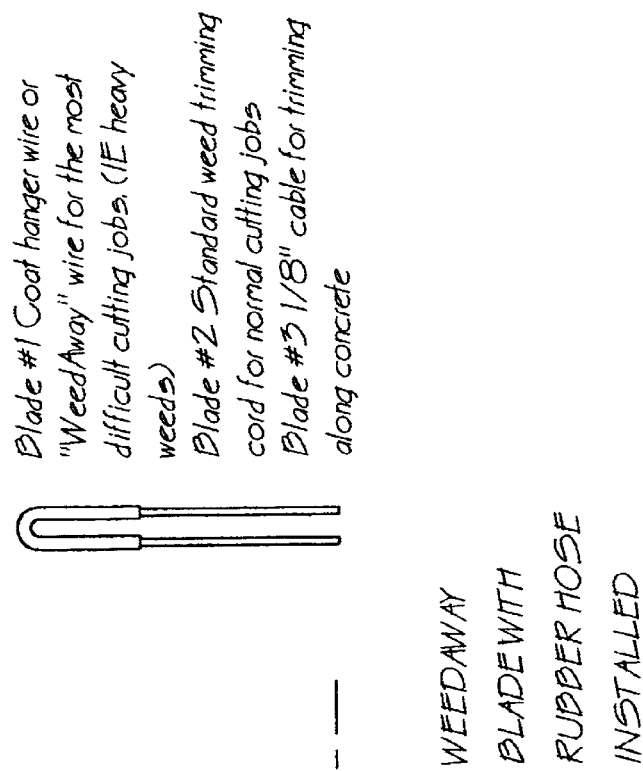
Figure 13:
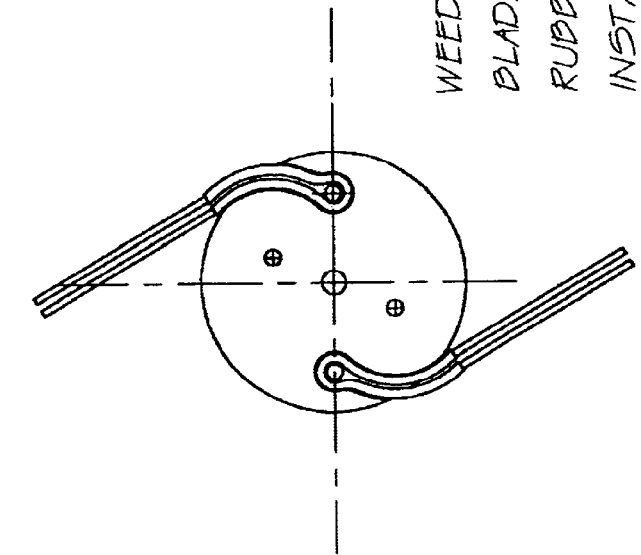
Figure 18:
Figure 17:
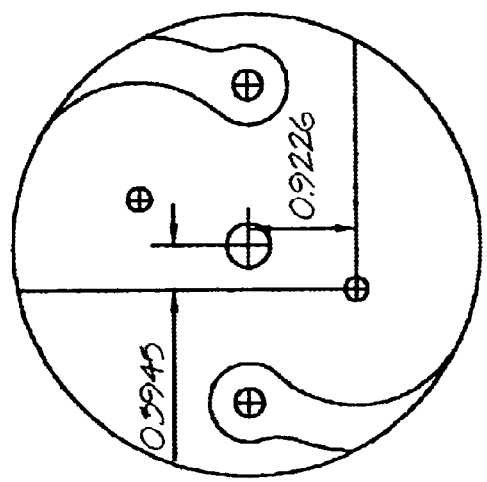
Figure 16:
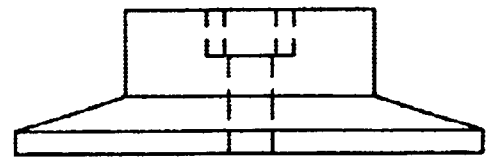
Figure 15:
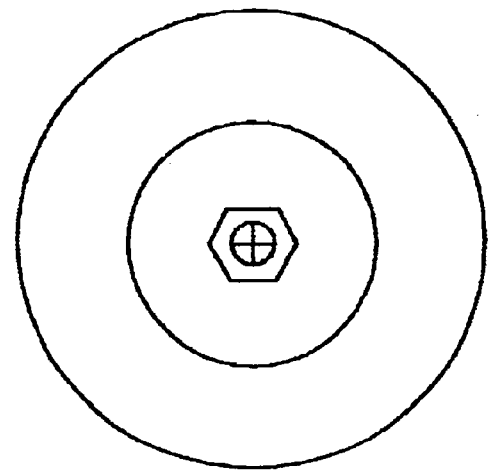
Figures 17A, 18A:
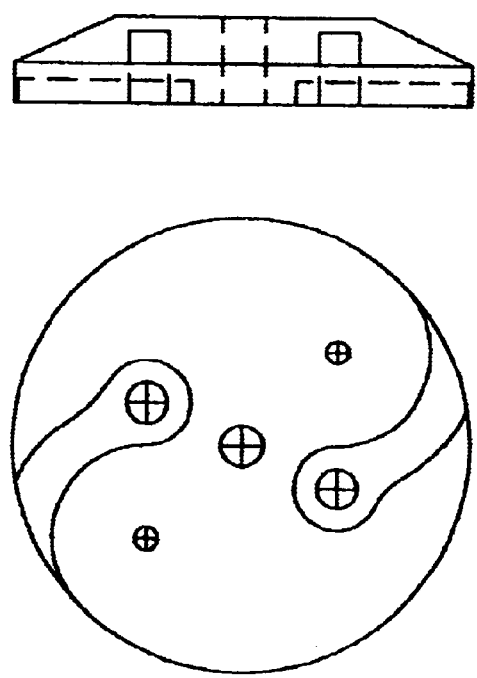
Figure 21:
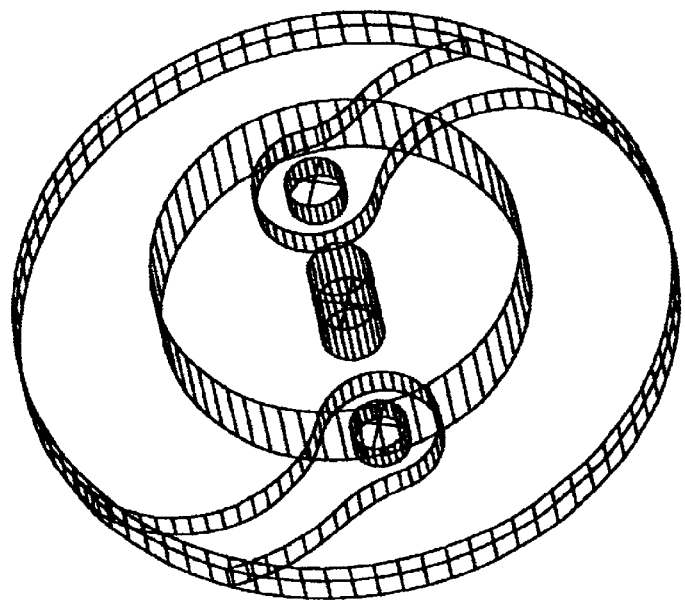
Figure 29:
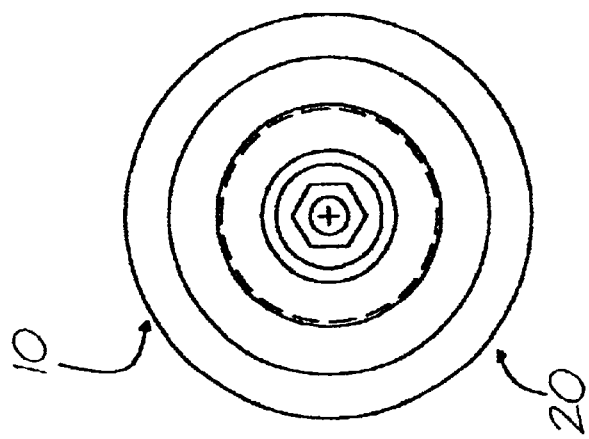

The weed cutter of the present application (hereinafter "Weed Away") is the newest concept in grass trimmers. Weed Away is designed to use wire coat hangers for the trimmer blade. Alternatively (and actually preferably) nails, such as 20d common nails, can be used for the trimmer blade.

With a simple Weed Away tool any one can make perfect Weed Away trimmer blades using the common household wire coat hanger or nails.

The Weed Away concept came out of hours of frustration using every type of trimmer head that continuously caused problems. The Weed Away is a simple 2-piece head with a nut to secure it to the trimmers. In hours of use the Weed Away allows you longer periods of use before replacing the cutters. The Weed Away has proven in hours of testing that it will cut through the toughest grass and large weeds with the utmost of ease.

The Weed Away head consists of three basic components. The upper plate 1 holds the cutters by hard steel pins and machined slots to hold the cutters. The pins are precision made and are pressed into the upper plate. The pins recess into the lower plate, capturing them in the lower plate for added safety.

The Weed Away head can be supplied with 6-4-3-2 blades.

The Weed Away will be offered for cutter of various horsepower, from 6-blade cutters for heavy commercial use down to a 2-blade cutter for the domestic models. The Weed Away is a serious tool and can handle the most serious weed cutting or trimming requirements.

The lower plate is fitted with holes slightly larger than the pins allowing them to recess into the lower plate capturing the pins for added safety. Holes are machined for pins to recess in them, capturing the pins for added safety. There is a tapered recess to help align the upper and lower plates.

The Weed Away tool is the heart of the trimmer. The tool is a simple bender that allows the user to make perfect weed away trimmer blades out of common household wire coat hangers. The only tool required that is not furnished is a pair of wire cutter pliers or the like.

The Weed Away tool is extremely simple and easy to use—the first requirement is a supply of wire coat hangers (Note: Weed Away wire will be offered as a substitute to the coat hanger if needed).

Now that you have supply of wire coat hangers continue as follows.

With a good set of wire cutters pliers (Note: wire cutter pliers not furnished) cut the hanger as close to the neck as possible. Straighten the coat hanger, the straighter the better. Now that you have done this continue as follows.

Place the straightened coat hanger in the tool as indicated. Bring wire to the gauge mark (make sure you have your tool as shown in FIG. 3). Bring the end of the coat hanger to the gauge mark. Rotate the handle as shown in FIG. 5, continuing until your tool is in the next position (shown in FIG. 5).

Cut the other wire to the proper length.

Remove wire from bender.

Once you have removed the wire from the bender it will have one leg longer than the other as pictured in FIG. 6. Cut the longer leg to the length of the shorter leg.

Now that you have cut your blade to length it looks like the wire shown in FIG. 7. All blades should be the same length.

The most important requirement is that all blades are the same length for balance. It is not critical, but the blades last longer With practice you will make perfect blades every time. Now that you have got the hang of making your weed away blades it is nice to have a supply of them made so that when it comes time to change them you will not have to stop to make blades.

The Weed Away blades are easily changed by following these simple steps.

With your trimmer in the upside-down position continue as follows.

Remove the retaining nut. After removal of the upper plate install Weed Away blades as shown in FIG. 11. Then replace the upper plate and replace the retaining nut. Tighten the retaining nut and you are ready to go.

Remember—practice makes perfect. You will find that it is fun to make the weed away blades but even more fun to use the "Weed Away" trimmer.

Always wear protective clothing and eye protection. Do not use Weed Away or any trimmer without a blade guard. Remember all weed trimmers are dangerous and should be used with utmost care to protect the user and to prevent injury to others. Do not use around people, pets or children. Weed trimmers throw rocks and other debris that can cause serious injury, even death.

FIGS. 27–32 disclose an alternative, preferred embodiment of the present invention, weed cutter head 10. Weed cutter head 10 can be used with either wires as with the other embodiment or with nails, such as 20d common nails. Weed cutter head 10 can be attached to a weed cutter, such as that shown in FIG. 9, with any suitable means.

As is well known in the art, 20d common nails are made of metal.

Figure 28:
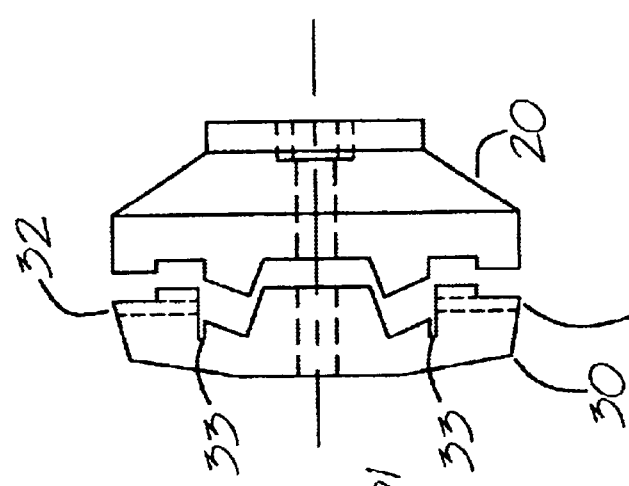
Figure 27:
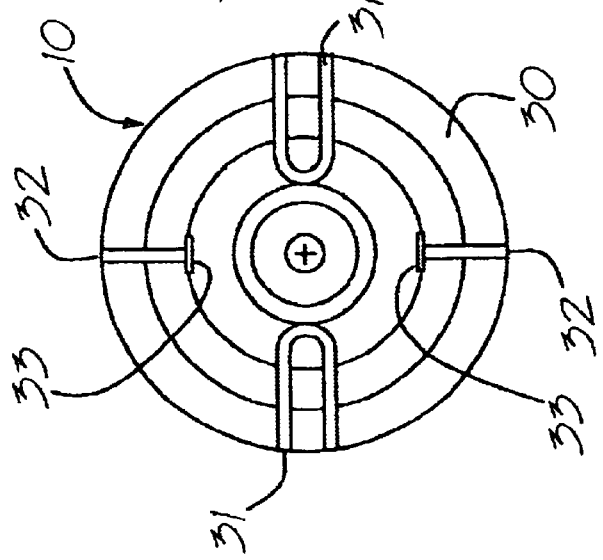

Weed cutter head 10 includes a top half 20 and a bottom half 30. The two halves 20 and 30 can be detached from one another, as shown in FIG. 28. The bottom half 30 includes recesses 31 for receiving blades made of coat hanger wire or heavy duty plastic weed trimmer cord and recesses 32 for receiving nails. Recesses 32 include nail head recesses 33 for receiving the heads of nails. When the top half 20 is clamped to the bottom half 30, the top half 20 secures the nails and/or wire and/or heavy duty cord in place.

Weed cutter head 10 could be made of any suitable material, such as plastic. Weed cutter head 10 could be made of, for example, nylon. It could be made out of polypropylene to keep down costs.

Figure 33:
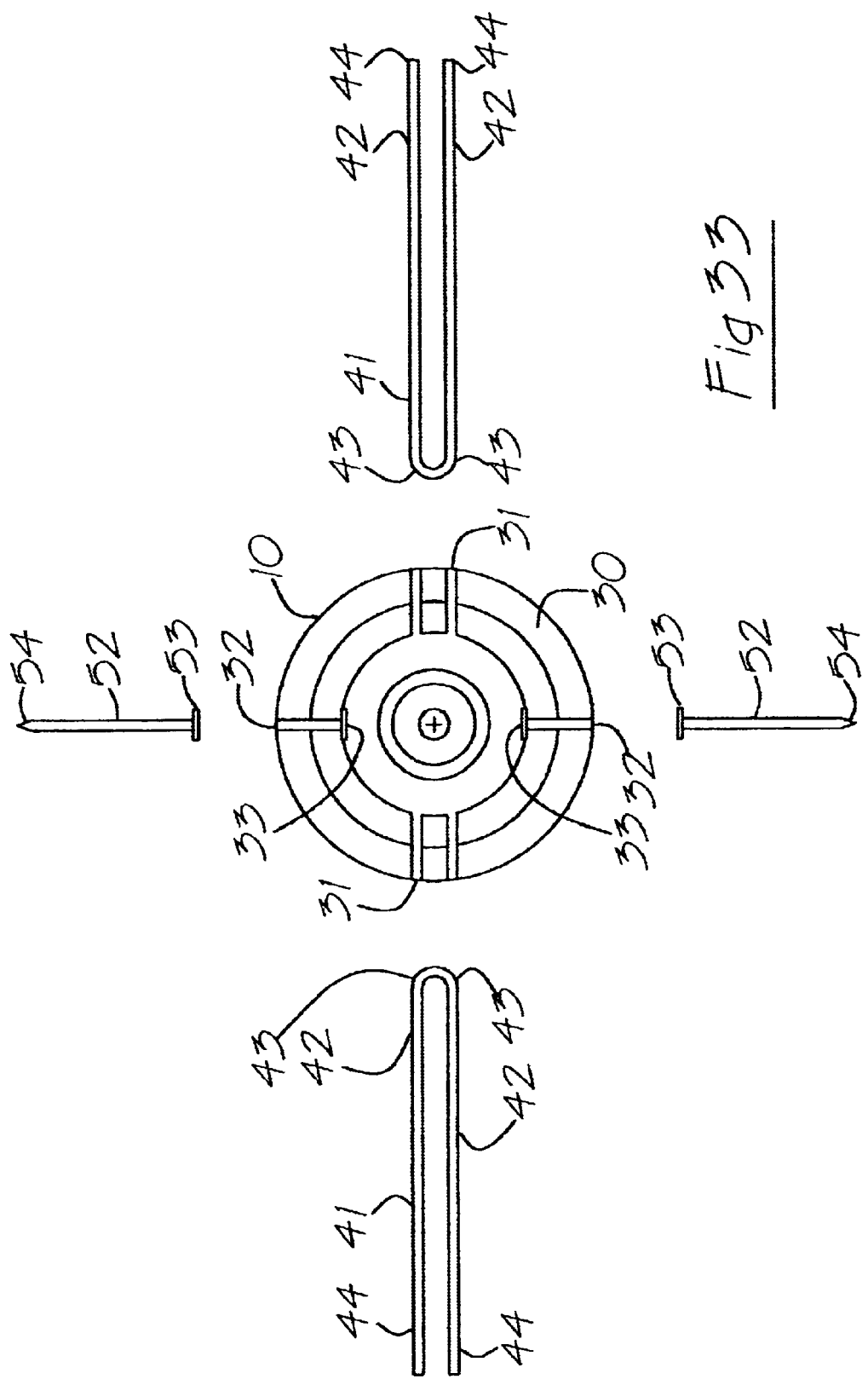

Each U-shaped blade 41 (see FIG. 33) has two legs 42, each leg 42 has a first end 43 and a second end 44, the first ends 43 of the legs 42 are connected to one another, and the blades are received in the first recess 31 with the second ends 44 of the legs 42 distal from the first recess 31. Nails 52 (see FIG. 33) are received in second recesses 32 with the heads 53 received in recesses 33 and the ends 54 of the nails 52 remote heads 53 distal of the recesses 32.

Weed cutter head 10 allows the use of, for example, 20d common nails for cutting heavy concentrations of weeds. Weed cutter head 10 also allows the user to make cutting blades from common household wire coat hangers. Weed cutter head 10 allows the use of 0.105 (heavy duty) weed trimmer cord for cutting around plants, and around the house in areas where the nails or wire blades could cause damage.

A major advantage of the weed cutter head 10 is that now one can use blades that will last longer, and are more readily available. Instead of a trip to the hardware store, one simply makes a trip to one's garage and keeps working.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. Apparatus for cutting weeds, comprising:
   a weed cutter head having means for attachment to a weed trimmer, wherein the weed cutter head includes first recess means for receiving U-shaped blades and second recess means for receiving nails in a manner which allows the nails to trim weeds;
   U-shaped blades receivable in the first recess means; and
   nails receivable in the second recess means.

2. The apparatus of claim 1, further comprising the weed trimmer.

3. The apparatus of claim 1, wherein the second recess means includes a recess for receiving a nail head and the nails have heads.

4. The apparatus claim 3, further comprising the weed trimmer.

5. The apparatus of claim 1, wherein the U-shaped blades are rigid and each blade has two legs of equal length.

6. The apparatus of claim 3, wherein the recess for receiving a nail head includes parallel, spaced apart vertical walls.

7. The apparatus of claim 1, wherein:
   the U-shaped blades are rigid,
   each blade has two legs,
   each leg has a first end and a second end,
   the first ends of the legs are connected to one another, and
   the blades are received in the first recess with the second ends of the legs distal from the first recess.

8. The apparatus of claim 2, wherein:
   the U-shaped blades are rigid,
   each blade has two legs,
   each leg has a first end and a second end,
   the first ends of the legs are connected to one another, and
   the blades are received in the first recess with the second ends of the legs distal from the first recess.

9. The apparatus of claim 3, wherein:
   the U-shaped blades are rigid,
   each blade has two legs,
   each leg has a first end and a second end,
   the first ends of the legs are connected to one another, and
   the blades are received in the first recess with the second ends of the legs distal from the first recess.

10. The apparatus of claim 4, wherein:
    the U-shaped blades are rigid,
    each blade has two legs,
    each leg has a first end and a second end,
    the first ends of the legs are connected to one another, and
    the blades are received in the first recess with the second ends of the legs distal from the first recess.

11. The apparatus of claim 5, wherein:
    the U-shaped blades are rigid,
    each blade has two legs,
    each leg has a first end and a second end,
    the first ends of the legs are connected to one another, and
    the blades are received in the first recess with the second ends of the legs distal from the first recess.

12. The apparatus of claim 6, wherein:
    the U-shaped blades are rigid,
    each blade has two legs,
    each leg has a first end and a second end,
    the first ends of the legs are connected to one another, and
    the blades are received in the first recess with the second ends of the legs distal from the first recess.

13. The apparatus of claim 1, wherein the nails are made of metal.

14. The apparatus of claim 2, wherein the nails are made of metal.

15. The apparatus of claim 3, wherein the nails are made of metal.

16. The apparatus of claim 4, wherein the nails are made of metal.

17. The apparatus of claim 5, wherein the nails are made of metal.

18. The apparatus of claim 6, wherein the nails are made of metal.

19. The apparatus of claim 7, wherein the nails are made of metal.

20. The apparatus of claim 8, wherein the nails are made of metal.

* * * * *